US007953725B2

(12) United States Patent
Burris et al.

(10) Patent No.: US 7,953,725 B2
(45) Date of Patent: May 31, 2011

(54) METHOD, SYSTEM, AND STORAGE MEDIUM FOR PROVIDING WEB INFORMATION PROCESSING SERVICES

(75) Inventors: Thomas J. Burris, Brooklyn, NY (US); Aroopratan D. Pandya, Hopewell Junction, NY (US); Dmitry Rekesh, Castro Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 10/993,336

(22) Filed: Nov. 19, 2004

(65) Prior Publication Data

US 2006/0112076 A1  May 25, 2006

(51) Int. Cl.
*G06F 17/30* (2006.01)
(52) U.S. Cl. ......................................... 707/710; 707/706
(58) Field of Classification Search .................. None
See application file for complete search history.

(56) References Cited

U.S. PATENT DOCUMENTS

| | | | |
|---|---|---|---|
| 5,924,105 A | 7/1999 | Punch, III et al. | |
| 6,304,967 B1 * | 10/2001 | Braddy | 713/150 |
| 6,336,142 B1 * | 1/2002 | Kato et al. | 709/227 |
| 6,493,702 B1 * | 12/2002 | Adar et al. | 707/3 |
| 6,546,393 B1 | 4/2003 | Khan | |
| 6,675,162 B1 | 1/2004 | Russell-Falla et al. | |
| 6,804,675 B1 * | 10/2004 | Knight et al. | 707/10 |
| 6,839,680 B1 * | 1/2005 | Liu et al. | 705/10 |
| 6,947,924 B2 * | 9/2005 | Bates et al. | 707/3 |
| 6,990,498 B2 * | 1/2006 | Fenton et al. | 707/102 |
| 7,031,961 B2 * | 4/2006 | Pitkow et al. | 707/4 |
| 7,080,371 B1 * | 7/2006 | Arnaiz et al. | 717/170 |
| 7,177,904 B1 * | 2/2007 | Mathur et al. | 709/204 |
| 7,269,590 B2 * | 9/2007 | Hull et al. | 707/10 |
| 2001/0049732 A1 * | 12/2001 | Raciborski et al. | 709/224 |
| 2002/0010739 A1 * | 1/2002 | Ferris et al. | 709/203 |
| 2002/0016922 A1 * | 2/2002 | Richards et al. | 713/200 |
| 2002/0023230 A1 * | 2/2002 | Bolnick et al. | 713/202 |
| 2002/0038299 A1 * | 3/2002 | Zernik et al. | 707/3 |
| 2002/0056008 A1 * | 5/2002 | Keane et al. | 709/245 |
| 2002/0188694 A1 * | 12/2002 | Yu | 709/218 |
| 2003/0037036 A1 | 2/2003 | Weare | |
| 2003/0050832 A1 * | 3/2003 | Jacobs et al. | 705/14 |
| 2003/0084439 A1 * | 5/2003 | Perkins et al. | 717/177 |
| 2003/0187880 A1 | 10/2003 | Brexel et al. | |
| 2003/0220912 A1 | 11/2003 | Fain et al. | |
| 2003/0220913 A1 | 11/2003 | Dognata et al. | |
| 2004/0015562 A1 * | 1/2004 | Harper et al. | 709/217 |

(Continued)

OTHER PUBLICATIONS

"Web Feed" [Online Reference: http://en.wikipedia.org/wiki/Web_feed]; Last modified Dec. 17, 2007.

(Continued)

*Primary Examiner* — Neveen Abel-Jalil
*Assistant Examiner* — Bai D Vu
(74) *Attorney, Agent, or Firm* — Cantor Colburn LLP; Derek Jennings

(57) ABSTRACT

Web information processing services are provided by scanning at least one data feed for content relevant to a first subject category and associating relevant content found as a result of the scanning with the first subject category. The first subject category is selected by a first web user. A first domain including results of the associating is created, and the first domain is associated with the first web user. The first domain is published as a syndicatable data feed over a network.

27 Claims, 13 Drawing Sheets

U.S. PATENT DOCUMENTS

| | | |
|---|---|---|
| 2004/0049728 A1 | 3/2004 | Langford |
| 2005/0097216 A1* | 5/2005 | Zalzalah et al. ............. 709/232 |
| 2005/0198493 A1* | 9/2005 | Bartas ........................... 713/154 |
| 2005/0267973 A1* | 12/2005 | Carlson et al. ................ 709/228 |
| 2006/0010240 A1* | 1/2006 | Chuah .......................... 709/228 |

OTHER PUBLICATIONS

"Mezzoblue: What is RSS/XML/Atom/Syndication?", Design, Typography, and the Web as seen by One Guy in Vancouver, B.C., Canada; May 19, 2004.

\* cited by examiner

METHOD, SYSTEM, AND STORAGE MEDIUM FOR PROVIDING WEB INFORMATION PROCESSING SERVICES

BACKGROUND

Embodiments of the invention relate generally to information processing, and more particularly, to a method, system, and storage medium for providing web information processing services utilizing social filtering and chaining functions.

Information is one of an organization's main sources of competitive advantage. It can enable a company to find an opportunity, identify and correct a liability, or provide input to the kind of synthesis that moves it forward. This is true today more than ever. The sources and range of information are expanding exponentially. Ironically, however, this increasing volume of information has a parallel trend in obscurity of information. The more information there is available, the harder it becomes to focus on the sources and subjects that are relevant.

A significant resource for obtaining information is the World Wide Web (Web). Web users utilize web browser programs and search engines for acquiring and processing desired information. There are two main activities associated with web information processing: aggregation and categorization. Aggregation is concerned with pulling together and representing collections of source data. Aggregation of source data can take different forms, which sometimes makes it difficult to process efficiently. However, the emerging acceptance of standards for syndicating aggregations makes the automated processing of aggregations of web data possible. A large number of websites now provide standardized feeds, and formatting of weblog information into a standardized form is native to most weblogging (blogging) software.

The second aspect, categorization, is the process of giving the source data context relative to a set of key words or a taxonomy. Categorization can be accomplished automatically via software or manually by human involvement. Search engines and Web directories operate via aggregation and categorization; bookmarks are an example of human-driven categorization. Aggregation and categorization of data may be presented as a domain of data sources.

It would be desirable to provide a system for utilizing aggregation and categorization tools to personalize and share domain information with other individuals or entities.

SUMMARY

Exemplary embodiments relate to a method, system, and storage medium for providing web information processing services. The method includes scanning at least one data feed for content relevant to a first subject category and associating relevant content found as a result of the scanning with the first subject category. The first subject category is selected by a first web user. The method also includes creating a first domain including results of the associating, and associating the first domain with the first web user. The method further includes publishing the first domain as a syndicatable data feed over a network.

The system includes a host system executing an information processing application including a categorization engine, a storage device in communication with the host system, and a link to a communications network The information processing application scans at least one data feed for content relevant to a first subject category and associates relevant content found as a result of the scanning with the first subject category. The first subject category is selected by a first web user. The information processing application also creates a first domain including results of the association, and associates the first domain with the first web user. The information processing application further publishes the first domain as a syndicatable data feed over a network.

The storage medium is encoded with machine-readable program code for providing web information processing services. The program code includes instructions for causing a processor to implement a method. The method includes scanning at least one data feed for content relevant to a first subject category and associating relevant content found as a result of the scanning with the first subject category. The first subject category is selected by a first web user. The method also includes creating a first domain including results of the associating, and associating the first domain with the first web user. The method further includes publishing the first domain as a syndicatable data feed over a network.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

In accordance with exemplary embodiments, a method, system, and storage medium for providing web information processing services are provided. The information processing system augments the standard approaches of aggregation and categorization with social filtering and chaining activities. The information processing system enables aggregation of source data utilizing a number of feeds and websites based upon what a user finds to be useful as a result of experience.

These feeds are submitted to an engine for processing, which includes categorizing each entry as well as its associated web link based upon a centralized taxonomy, a user's personalized taxonomy, or a combination of both, the results of which are referred to as a user domain. The user may then modify the categorization of specific web links, if desired. In doing so, not only is the categorization (moving a link from one category to another), tangibly refined, but also the categorization engine becomes trained to perform more accurate categorization functions. Over time, the categorization engine improves, as it learns the preferences of its user or community of users. This process is referred to as categorization and, to the extent that the user customizes the categorization to suit their own personal needs and preferences, social filtering.

Each of the user's categories, whether based on a central or personalized taxonomy, can be syndicated and made available via the web or other means so that other users can consume the categories of another user's domain automatically, and incorporate them into their own domain using the process described above. This process is referred to as chaining and, as the categories are refined through each subsequent user's actions and progressive sharing, social filtering. Chaining of domain information may be implemented using standardized formatting tools such as Rich Site Summary or RDF Site Summary (RSS) developed by Netscape®, Atom, or Outline Processor Markup Language (OPML). RSS and Atom are standardized, XML-based formats that encapsulate headlines, URLs, and summaries (among other information depending upon the format) of a group of links. An RSS file is a feed that syndicates (e.g., makes available) the content for other sites or applications to use. Atom encapsulates a variety of different data formats such as MP3s and video. OPML enables publishers of data to provide listings and directories of their new feeds.

The information processing system constitutes a dynamic information filter that works by harnessing the normal user activities of sorting and organizing web information, as well as by allowing the results of these activities to be syndicated and shared with others, thereby establishing a loop that progressively refines the filter with little or no intentional human intervention.

Figure 1:
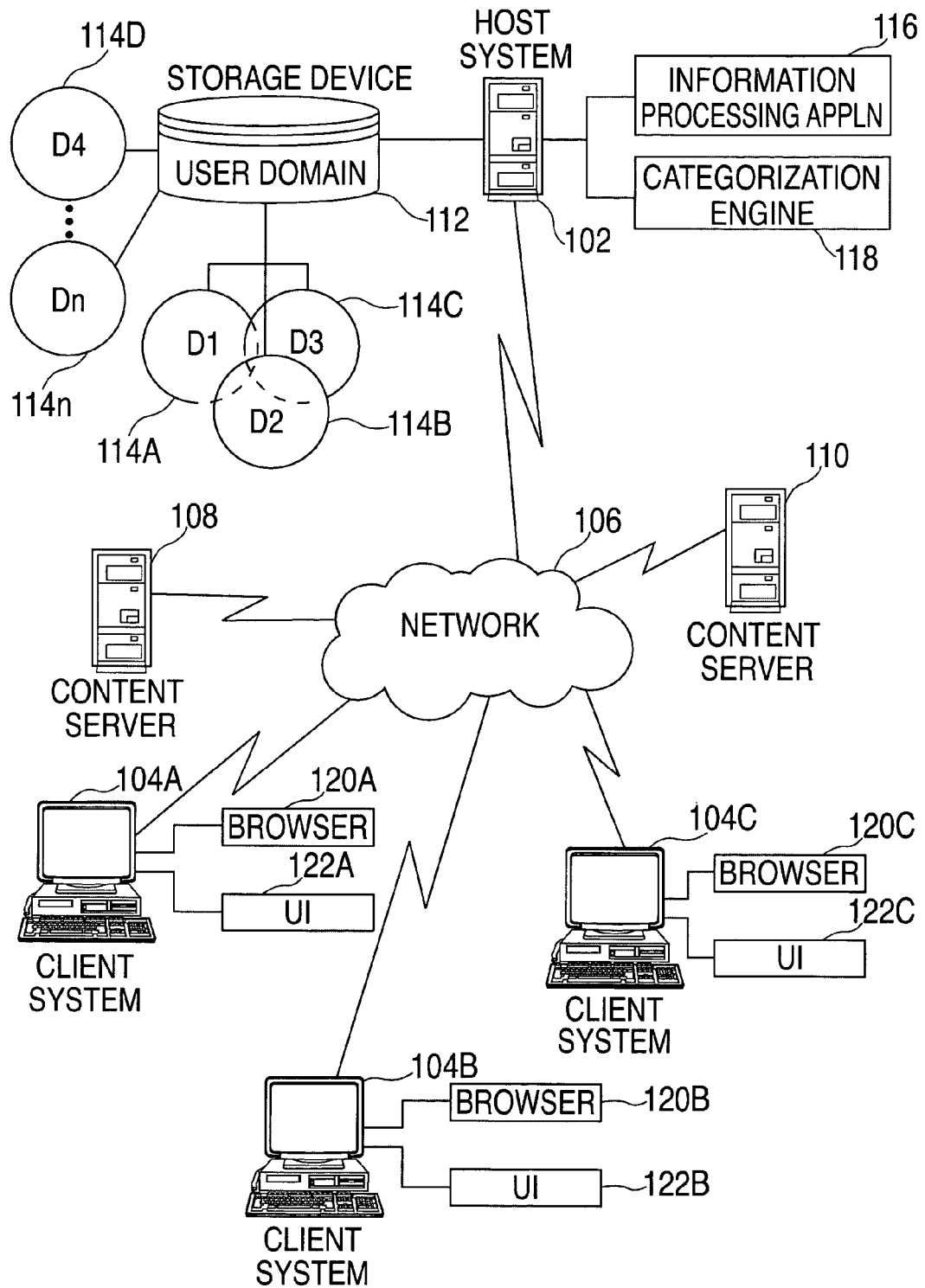
FIG. 1 is a block diagram of a system upon which the information processing services may be implemented in exemplary embodiments.

Turning now to FIG. 1, a block diagram of a system upon which the information processing services may be implemented in exemplary embodiments will now be described. The system of FIG. 1 includes a host system 102 in communication with client systems 104A-C and two content servers 108 and 110 via a network 106. Host system 102 may be implemented using one or more servers operating in response to a computer program stored in a storage medium accessible by the server(s). The host system 102 may operate as a network server (e.g., a web server) to communicate with client systems 104A-C. The host system 102 may handle sending and receiving information to and from client systems 104A-C and may perform associated tasks.

The host system 102 may also operate as an application server. In accordance with exemplary embodiments, the host system 102 executes one or more computer programs to provide information processing services. These one or more computer programs are referred to collectively herein as an information processing application 116. Additionally, host system 102 executes a categorization engine 118. Categorization engine 118 may be a text categorizer algorithm (e.g., Bayesian categorizer). In alternative embodiments, the information processing application 116 and the categorization engine 118 may be implemented as a single application. In yet further embodiments, the categorization engine 118 may reside on one or more of client systems 104A-C.

Information processing activities may be shared by the client systems 104A-C and the host system 102 by providing an application (e.g., java applet) to the client systems 104A-C. Alternatively, client systems 104A-C may include standalone software applications for performing a portion of the processing described herein. In yet further embodiments, the information processing system functions may be built in to a web browser application such as applications 120A-C. As previously described, it is understood that separate servers may be utilized to implement the network server functions and the application server functions of host system 102. Alternatively, the network server and the application server may be implemented by a single server executing computer programs to perform the requisite functions described with respect to host system 102.

Client systems 104A-C may be coupled to host system 102 via network 106. Each of client systems 104A-C may be implemented using a general-purpose computer executing a computer program for carrying out some of the processes described herein. The client systems 104A-C may be personal computers (e.g., a lap top, a personal digital assistant) or host attached terminals.

For purposes of illustration; client systems 104A-C are operated by consumers of Internet services including web services. Client systems 104A-C each include a web browser application 120A-C, respectively (e.g., Internet Explorer®, Netscape Navigator®, etc.), for performing web activities. The information processing system application 116 may provide users of client systems 104A-C with a user interface 122A-C, respectively, for facilitating the information processing activities described herein.

In exemplary embodiments, the information processing system shown in FIG. 1 includes a storage device 112. Storage device 112 is in communication with host system 102 and may be implemented using a variety of devices for storing electronic information. It is understood that the storage device 112 may be implemented using memory contained in the host system 102 or it may be a separate physical device. The storage device 112 is logically addressable as a consolidated data source across a distributed environment that includes network 106. Information stored in the storage device 112 may be retrieved and manipulated via the host system 102 and authorized users of clients systems 104A-C. The storage device 112 houses one or more user domains 114A-114n, and other information desired by the service provider of host system 102. User domains refer to syndicatable feeds of information that have been categorized and, optionally, socially filtered by a particular user. For purposes of illustration, the user domains 114A-C are chained and correspond to client systems 104A-C, respectively. When providing chaining functions, host system 102 acts as a content server, publishing user domain information as syndicatable feeds of source information that are consumable by client systems, such as client systems 104A-C. The chaining process is described further in the flow diagram of FIG. 2. In an exemplary embodiment, the host system 102 operates as a database server and coordinates access to application data including data stored on storage device 112.

Content servers 108 and 110 refer to data sources accessed by one or more users of client systems 104A-C and host system 102. Content servers 108 and 110 provide feeds of syndicatable information such as news articles, white papers, public service data, and other similar types of information. For example, content server 108 may be operated by a news organization or web portal enterprise.

Network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. Client systems 104A-C may be coupled to the host system 102 through multiple networks (e.g., intranet and Internet) so that not all client systems are coupled to the host system 102 through the same network. One or more of the client systems and the host system 102 may be connected to the network 106 in a wireless fashion.

As indicated above, the information processing system may be implemented via a separate application 116 or may be built into one or more existing applications (e.g., categorization engine 118). The flow diagram of FIG. 2 describes a process for implementing the information processing system. It is assumed for purposes of illustration, that the information processing services are provided via a web service provider system. It is also assumed that users (client systems 104A-C) are registered with host system 102 for these services. Registration may be performed via user interfaces 120A-C, a sample of which is shown in FIG. 3. User interface screen 300 enables a prospective consumer of the information processing services to select sources of information (e.g., feeds) 301 to be searched by the categorization engine 118. The user may also select preferences from existing categories (CATEGORIES 302) of information or to personalize the categories by entering a user-defined category in box 306 of PERSONALIZE option 304. Once entered, a user selects SUBMIT option 308 and the information processing application 116 creates a user domain (e.g., domain, 114A) and saves these preferences in the domain 114A of storage device 112.

Figure 2:
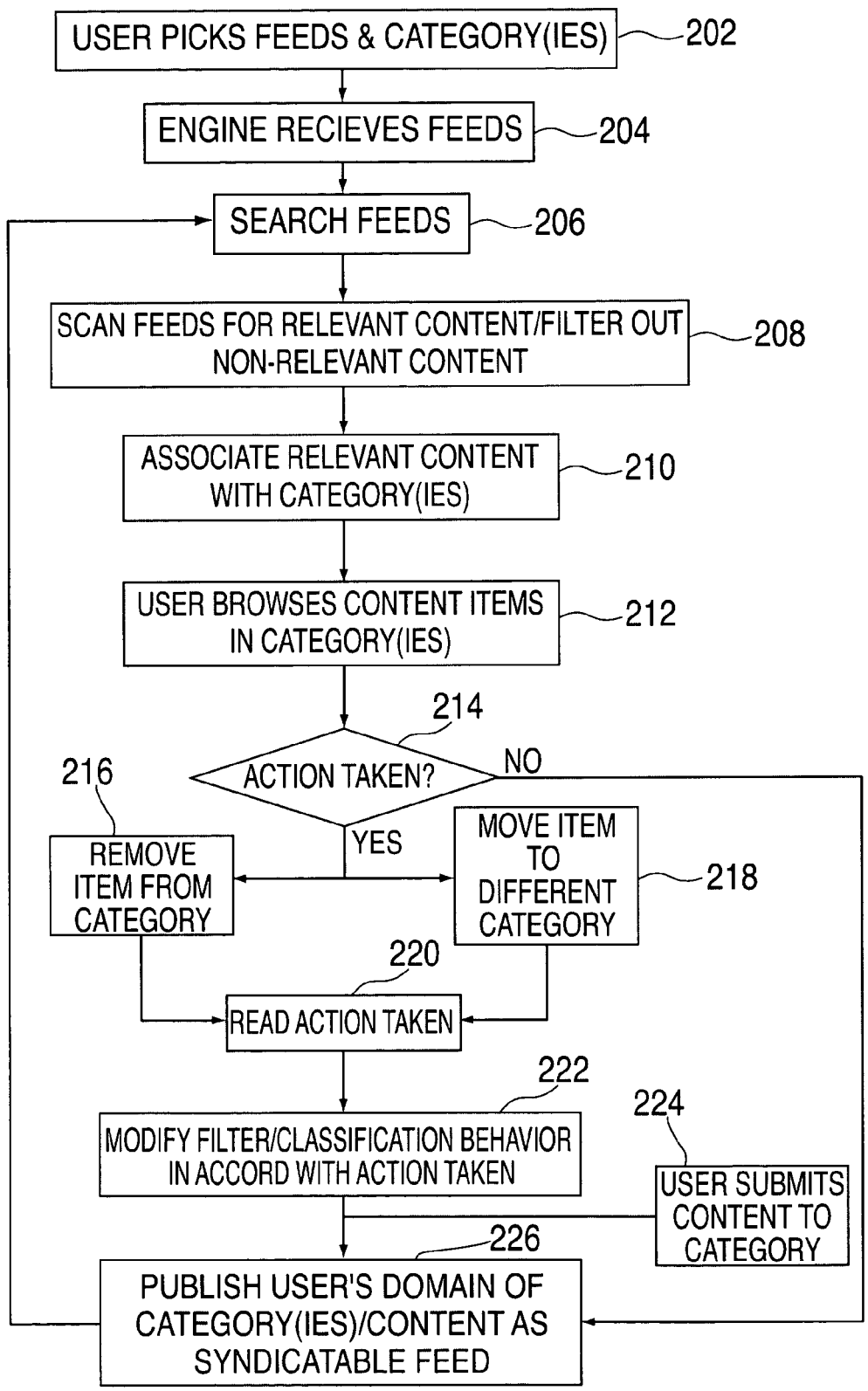
FIG. 2 is a flow diagram of a process for implementing the information processing system in exemplary embodiments.
Figure 3:
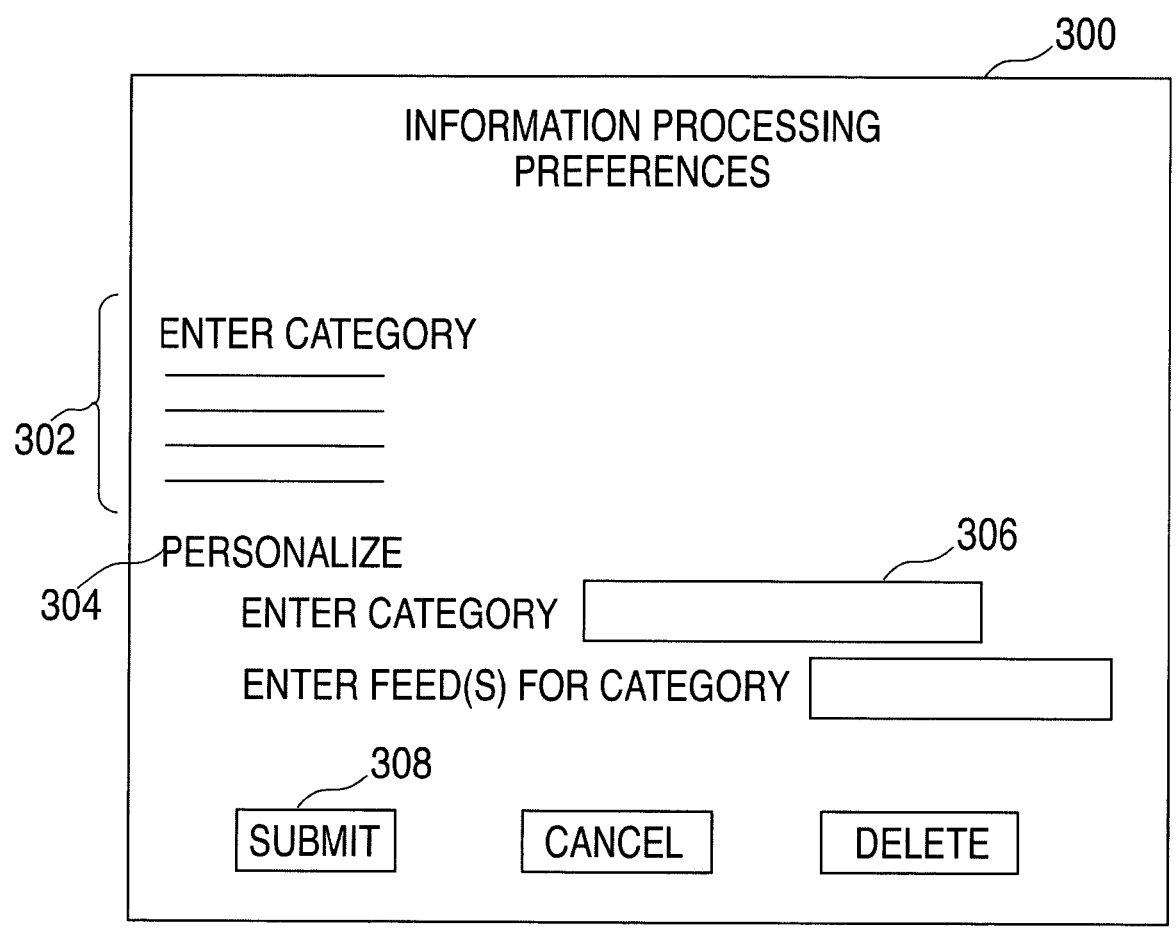
FIG. 3 is a user interface screen depicting a sample preference settings window of the information processing system application in exemplary embodiments.

Turning now to FIG. 2, a flow diagram of a process for implementing the information processing system will now be described. A user of client system 104A selects information sources and categories via, e.g., the user interface screen 300 of FIG. 3 at step 202. The information sources may be acquired and selected during the course of conducting activities over the Web (e.g., searching, browsing, accessing websites such as content servers 108 and 110, etc.). This activity can be persistent (as in a user's Bookmarks in Internet Explorer®) or it can be transient (as in a Google® search based upon keywords). The user may select multiple feeds for each category.

Figure 4:
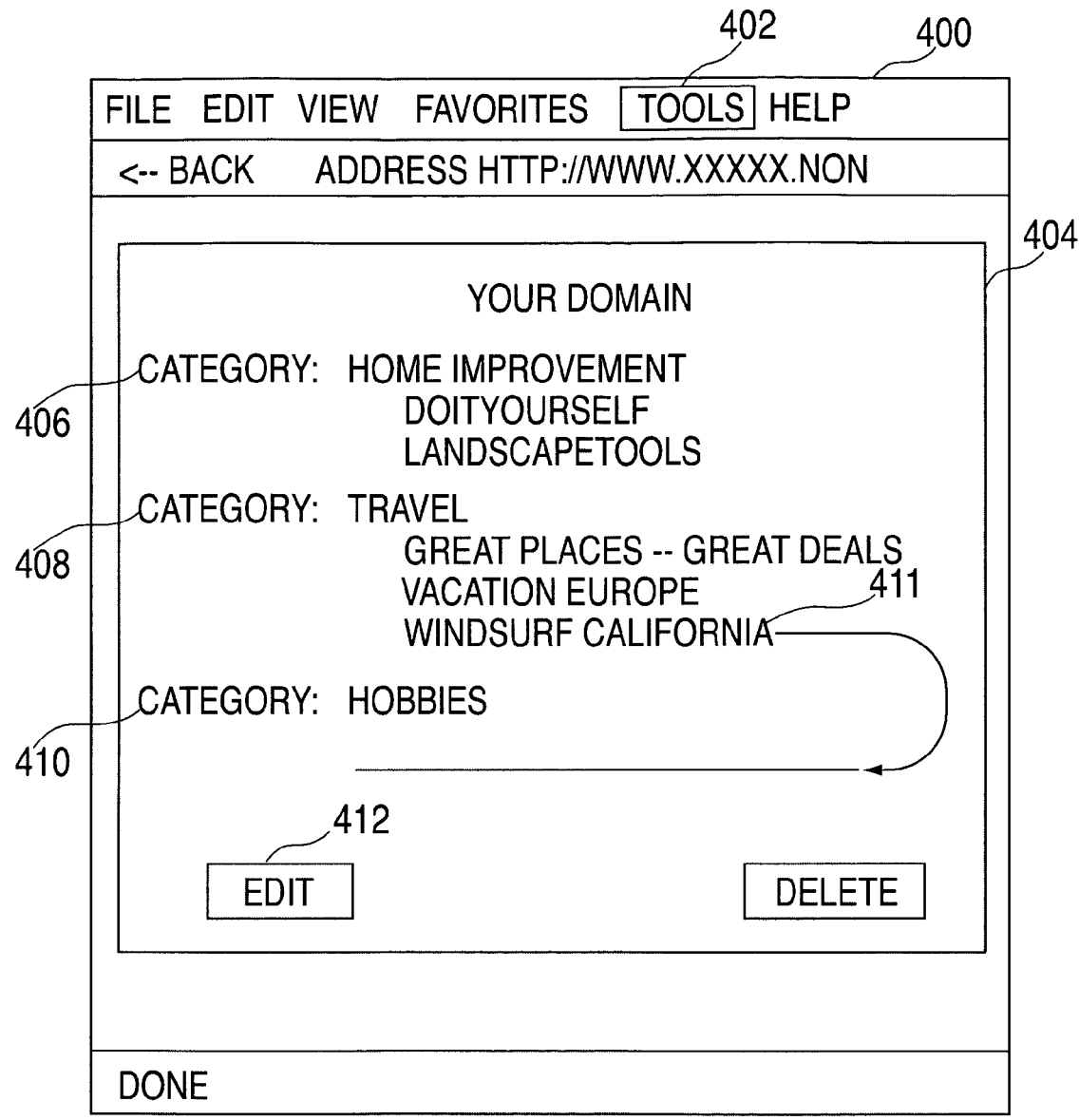
FIG. 4 is a user interface screen depicting a sample user domain window generated by the information processing system in exemplary embodiments.

Once the user identifies any preferred data sources or feeds resulting from these activities, the user presents the source information to host system 102 via, e.g., the SUBMIT option 308 provided on the user interface screen 300. Alternatively, if the information processing functions are built into the user's web browser 120A, the user may submit the selections via the web browser 120A. For example, the user interface 400 of FIG. 4 depicts a browser screen window. The user would initiate the information processing functions by selecting the TOOLS option 402 on the toolbar of screen 400, which in turn, causes a subwindow (not shown) to be presented to the user. The subwindow may provide instructions on how to provide data source information to the host system 102 (e.g., drag and drop function).

These feeds are submitted to categorization engine 118 for processing at step 204. Once the categorization engine 118 receives the feed information, the engine 118 scans the content of these feeds, looking for items that relate to the category for which the feed is being searched at step 208. During this process, the engine 118 filters out any content that does not relate to the category. The criteria for searching may be based upon key words that have been assimilated with the category.

The information processing application 116 updates the user domain with the results of the searching and categorization activities at step 210, a sample of which is shown in FIG. 4. As shown in the browser screen 400, the user domain 404 of client system 104A includes three user-defined categories: HOME IMPROVEMENT 406, TRAVEL 408, and HOBBIES 410. Within each category are elements of the data feeds or content items (articles, reports, white papers, etc.) relevant to the category and provided as a result of the scanning and filtering of steps 206-208. The user browses the content items at step 212.

If desired, the user may modify the categorization of these content items. At step 214, it is determined whether the content items will be modified. If not, then no action is taken on the domain and the information processing application 116 publishes the domain information as a syndicatable data feed at step 226. If, on the other hand, the user desires to modify the categorization results reflected in the domain, there are two possible options available. The user may delete a content item from a category if he/she determines that it is not relevant or if it is not useful to the user at step 216. Alternatively, the user may determine that a content item placed in one category of the domain is better suited for another category. In this instance, the user may move the content item to a different category at step 218. For example, in user interface screen 400, the user selects the content item, WIND SURF CALIFORNIA 411 from the TRAVEL category 408 and moves it to the HOBBIES category 410 via the EDIT option 412. Steps 216-218 are referred to as social filtering.

At step 220, the information processing application 116 detects the change made to the categories. The information processing application 116 includes logic for evaluating changes made by a user so that the categorization engine modifies its categorization functions in accordance with the user's behavior at step 222. This step is referred to as training the classifier. By modifying the categories, not only is the categorization (moving a link from one category to another), tangibly refined, but also the categorization engine 118 becomes trained to perform more accurate categorization. Over time, the categorization engine 118 improves, learning the preferences of its user or community of users.

In addition to, or alternatively, the user may select content found as a result of, e.g., a web search, and associate it directly with a category at step 224. This may be accomplished, e.g., by entering a URL for the content item via the TOOLS option 402 of FIG. 4, or in another suitable manner. Actions taken on the part of the user (e.g., steps 216, 218, and 224) are used by the categorization engine 118 in training the classifier to refine the scanning and search activities recited above in order to provide the user with more personalized content in his/her domain.

At step 226, the information processing application 116 publishes the user domain 114A as a syndicatable feed of information that is consumable by other client systems. This may be accomplished by formatting the domain 114A into a standardized format such that the domain information may then be available to users of other client systems (e.g., 104B-C) when establishing their domains 114B-C, respectively. For example, the user of client system 104B adopts categories from domain 114A by selecting the domain 114A as one of his/her feeds for a particular category in a manner similar to that described above in step 202. As a result, the user of client system 104B will have access to the same content items that are provided in the categories provided in the domain 114A to the extent that the user of client system 104B does not further modify the categories adopted. The user of client system 104B may then 'train' the classifier by editing the items in his/her personal domain 104B in a manner similar to that described above in steps 214-218. Likewise, a user of client system 104C may incorporate some of both user domains 114A-B into his/her domain 114C. This is reflected in the overlapping (chaining) of domains 114A-C as shown in FIG. 1. Domains 114D-114n reflect that no chaining activities have been conducted.

As described above with respect to FIG. 1, the information processing system of the present invention may reside on a stand-alone computer system, which may have access to the Internet, or may reside on a computer system which is part of the network through which there is Internet access. With a connection to a network and/or the Internet, there are several different ways in which the process software used to implement the systems and methods of the intelligent team management system may be integrated with the network, and deployed using a local network, a remote network, an e-mail system, and/or a virtual private network. The following descriptions review the various ways of accomplishing these activities.

Integration of Information Processing System Software. To implement the information processing systems and methods of the present invention, process software, which is composed of the software as described above and related components including any needed data structures, is written and then if desired, integrated into a client, server, and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of the same with reference to the flowcharts of FIGS. 5A and 5B.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems are identified and compared to the list of operating systems, version numbers, and network software that have been tested to work with the process software. Those operating systems, version numbers, and network software that do not match the list of tested operating systems and version numbers are then upgraded on the clients and servers to the required level.

After ensuring that the software resident on the computer systems where the process software is to be deployed is at the correct version level(s), that is, has been tested to work with the process software, the integration is completed. This is done by installing the process software on the clients and servers. Armed with the foregoing overview of the integration activity, the following detailed description of the same should be readily understood.

Figure 5A:
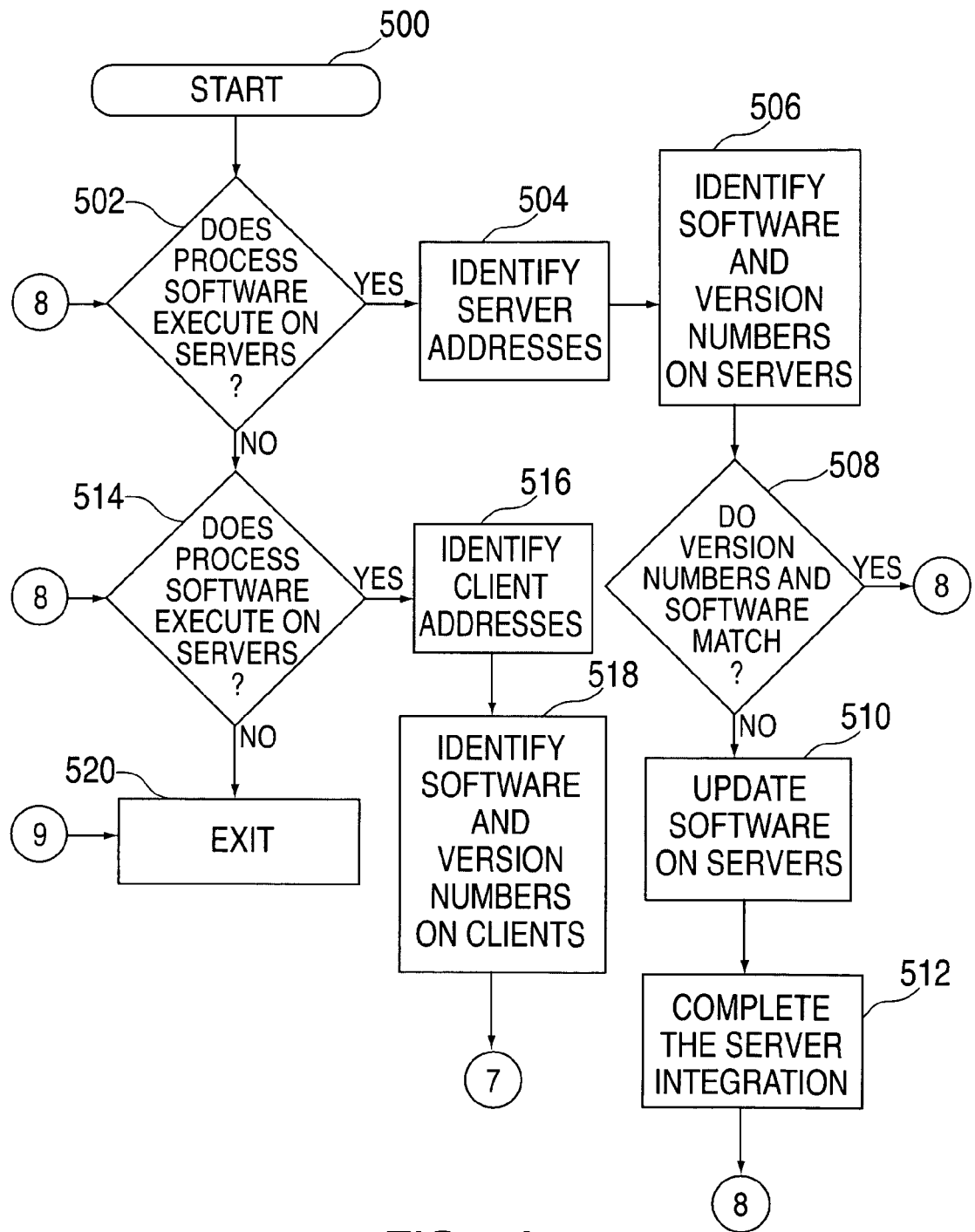
FIGS. 5A and 5B are flowcharts illustrating how the process software implementing the systems and methods of the invention may be integrated into client, server, and network environments.
Figure 5B:
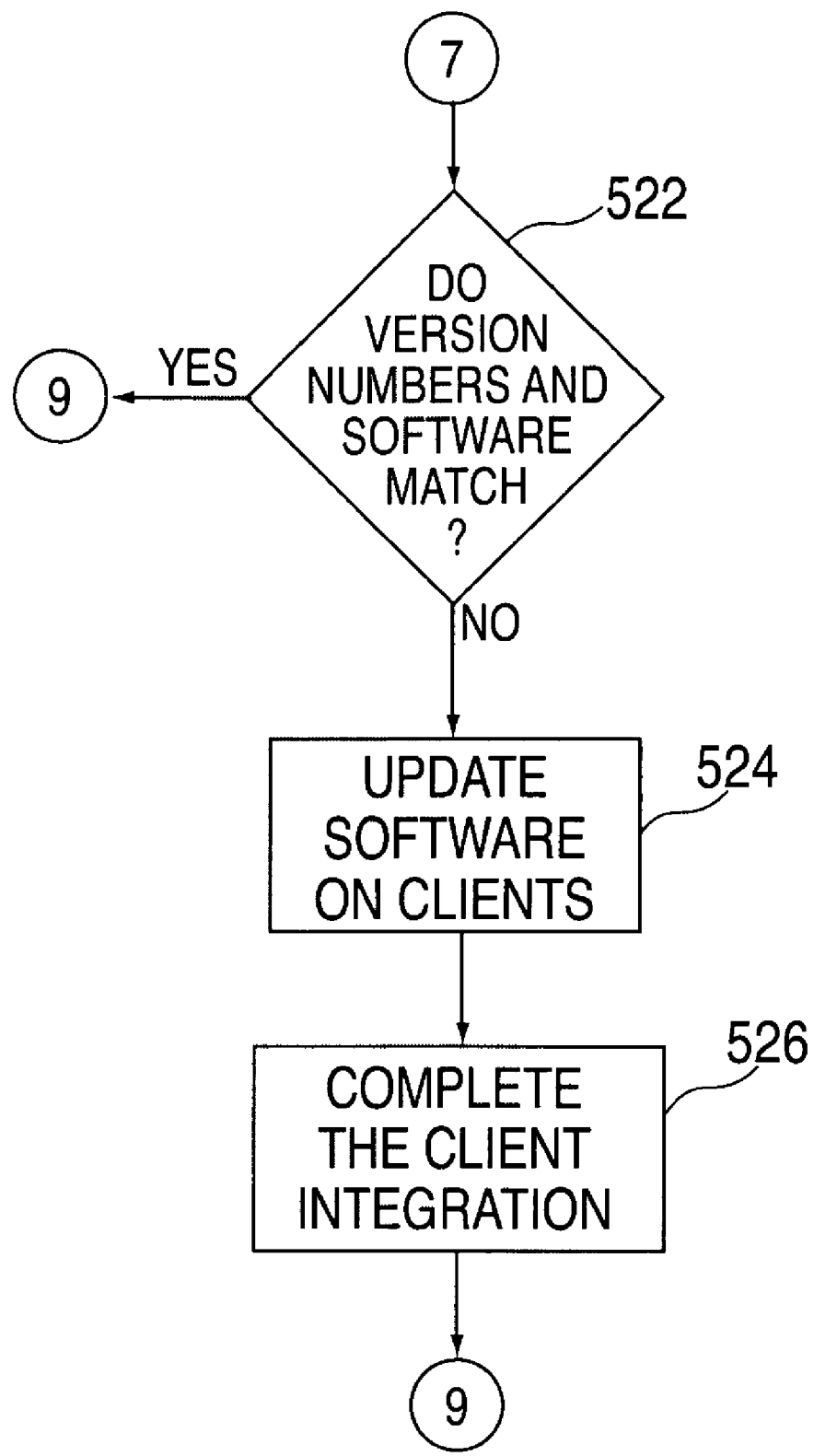

Referring to FIGS. 5A and 5B, step 500 begins the integration of the process software for implementing the information processing systems and methods of the present invention. It is determined whether there are any process software programs that will execute on a server or servers at step 502. If this is not the case, then integration proceeds to determine if the process software will execute on clients at step 514. If there are process software programs that will execute on a server(s), then the server addresses are identified at step 504. The servers are checked to see if they contain software that includes the operating system (OS), applications, and network operating systems (NOS), together with their version numbers, that have been tested with the process software at step 506. The servers are also checked to determine if there is any missing software that is required by the process software as part of the activity at step 506. A determination is made whether the version numbers match the version numbers of OS, applications and NOS that have been tested with the process software at step 508. If all of the versions match, and there is no missing required software, the integration continues at step 514. If one or more of the version numbers do not match, then the unmatched versions are updated on the server or servers with the correct versions at step 510. Additionally, if there is missing required software, then it is updated on the server or servers at step 510. The server integration is completed by installing the process software at step 512.

Step 514, which follows either step 502, 508 or 512, determines if there are any programs of the process software that will execute on the clients. If no process software programs execute on the clients, the integration proceeds to step 520 and exits. If there are process software programs that will execute on clients, the client addresses are identified at step 516.

At step 518, the clients are checked to see if they contain software that includes the operating system (OS), applications, and network operating systems (NOS) software, together with their version numbers, that have been tested with the process software. The clients are also checked at step 518 to determine if there is any missing software that is required by the process software.

At step 522, a determination is made if the version numbers match the version numbers of OS, applications and NOS that have been tested with the process software. If all of the versions match, and there is no missing required software, then the integration proceeds to step 520 and exits.

If one or more of the version numbers do not match, then the unmatched versions are updated on the clients with the correct versions at step 524. In addition, if there is missing required software, then it is updated on the clients as part of step 524. The client integration is completed by installing the process software on the clients at step 526. The integration proceeds to step 520 and exits.

Deployment of Information Processing System Software. It should be well understood that the process software for implementing the information processing system of the present invention may be deployed by manually loading the process software directly into the client, server, and proxy computers from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and then stored on the proxy server. Armed with this overview of the possible deployment processes, the following detailed description of the same with reference to FIGS. 6A and 6B, where the deployment processes are illustrated, will be more easily understood.

Step 600 begins the deployment of the process software. It is determined whether there are any programs that will reside on a server or servers when the process software is executed at step 602. If the answer is "yes", then the servers that will contain the executables are identified, as indicated in step 636 in FIG. 6B. The process software for the server or servers is transferred directly to the servers' storage via FTP or some other protocol or by copying though the use of a shared file system at step 638. The process software is then installed on the servers as indicated at step 640.

Figure 6A:
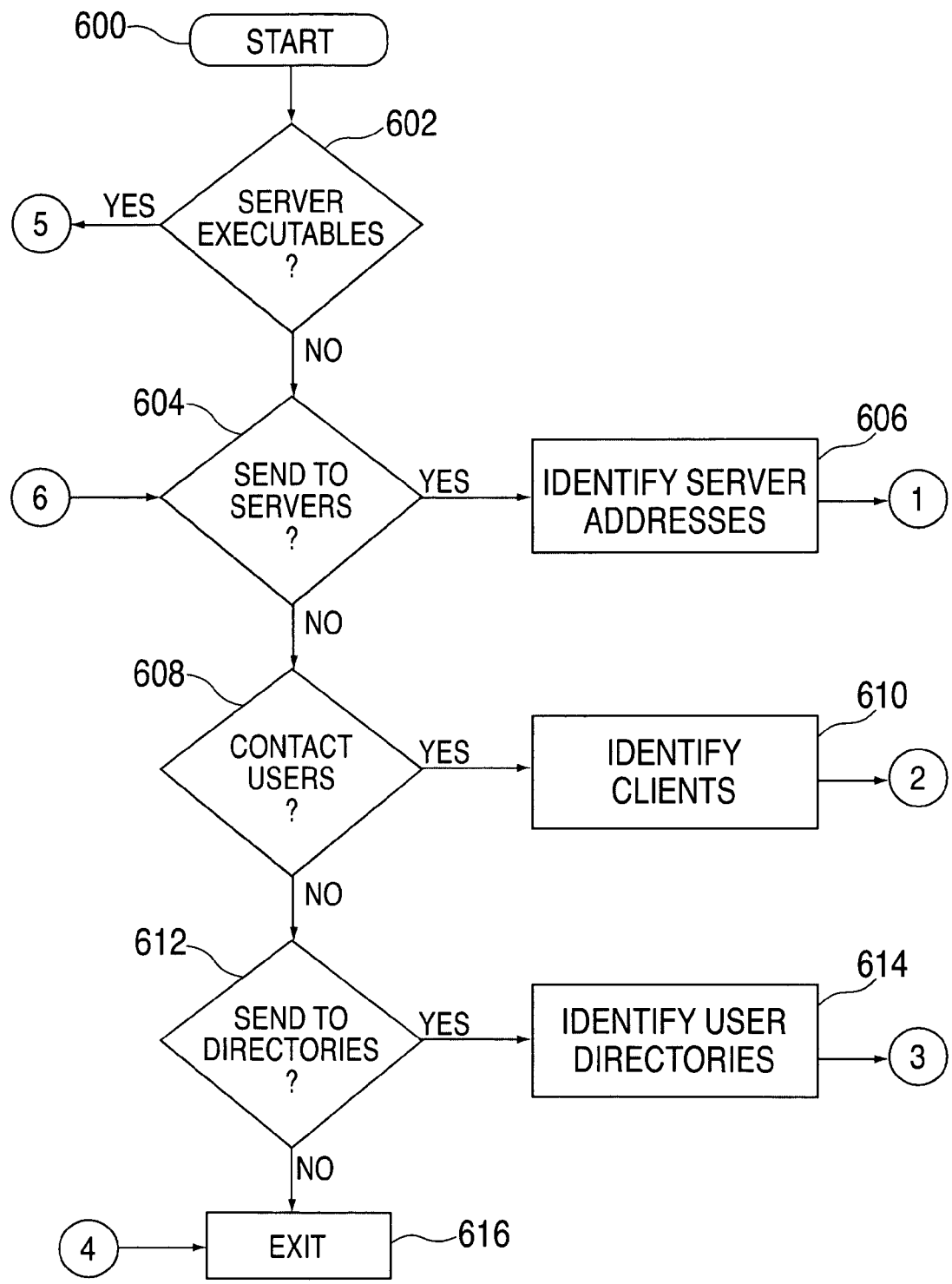
FIGS. 6A and 6B are flowcharts illustrating various ways in which the process software of the invention may be semi-automatically or automatically deployed across various networks and onto server, client (user), and proxy computers.
Figure 6B:
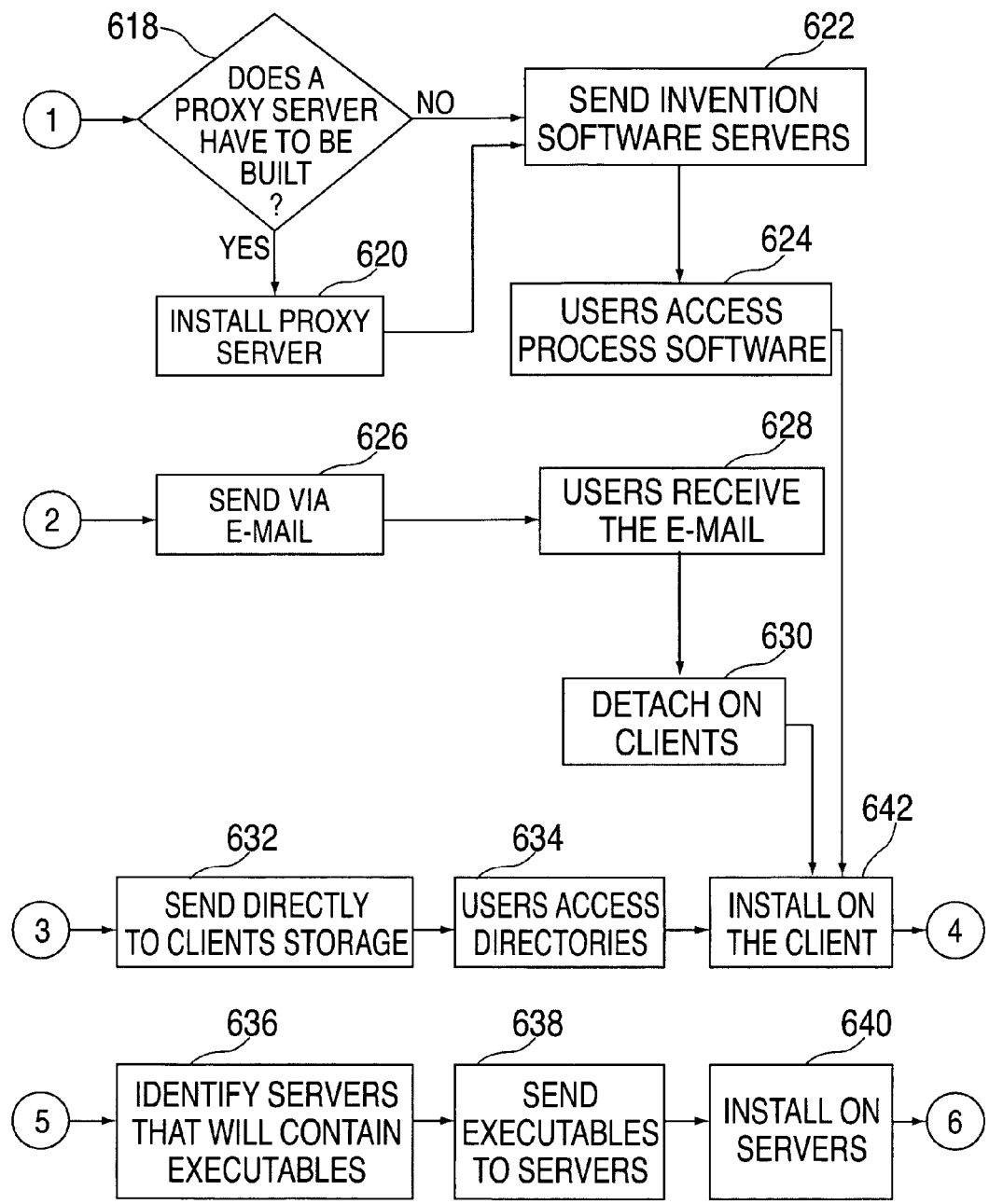

Next, as shown in step 604 in FIG. 6A, a determination is made on whether the process software is to be deployed by having users access the process software on a server or servers. If the users are to access the process software on servers, then the server addresses that will store the process software are identified at step 606.

Next, as shown at step 618, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed as indicated at step 620. Next, the process software for implementing the present invention is sent to the servers, as indicated in step 622 either via a protocol such as FTP or it is copied directly from the source files to the server files via file sharing. Another way of sending the process software to the servers is to send a transaction to the servers that contained the process software and have the server process the transaction. In this manner, the process software may be received by and copied into the server's file system. Once the process software is stored at the servers, the users via their client computers, then access the process software on the servers and copy it into to the file systems of their client computers at step 624. Another alternative is to have the servers automatically copy the process software to each client and then run the installation program for the process software at each client computer. Either way, the user computer executes or causes to be executed the program that installs the process software on the client computer at step 642, then the process exits at step 616.

Continuing now at step 608 in FIG. 6A, a determination is made as to whether the process software is to be deployed by sending the process software to users via e-mail. If the answer is yes, then, as indicated at step 610, the set of users where the process software will be deployed are identified together with the addresses of the user client computers. The process software is sent via e-mail in step 626 (shown in FIG. 6B) to each of the users' client computers. Then, as indicated in step 628, the users receive the e-mail, and then detach the process software from the e-mail to a directory on their client computers at step 630. The user then executes the program that installs the process software on his client computer at step 642, and then exits the process at step 616.

Continuing at step 612 (see bottom of FIG. 6A), a determination is made on whether the process software will be sent directly to user directories on their client computers. If so, the user directories are identified at step 614. Then, the process software is transferred directly to the identified directory on the user's client computer, as indicated in step 632. This can be done in several ways such as, but not limited to, sharing of the file system directories and then copying them from the sender's file system to the recipient user's file system or, alternatively, using a transfer protocol such as File Transfer Protocol (FTP). Next, the users access the directories on their client file systems, as indicated in step 634, in preparation for installing the process software. Finally, the user executes the program that installs the process software on his client computer at step 642 and then exits the process at step 616.

Use of Virtual Private Networks for Information Processing System Software. The process software may be deployed, accessed and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as a leased line, the VPN uses "virtual" connections routed through the Internet from the company's private network to the remote site or employee(s). Access to the software via a VPN can be provided as a service by specifically constructing the VPN for purposes of delivery or execution of the process software (i.e., the software resides elsewhere). In such an instance, the lifetime of the VPN is often limited to a given period of time or to a given number of deployments based on an amount paid.

The process software may be deployed, accessed, and executed through either a remote-access VPN or a site-to-site VPN. When using a remote-access VPN, the process software is typically deployed, accessed, and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters can then dial a phone number (often a toll-free number) or attach directly via a cable, DSL, or wireless modem to reach the NAS and use their VPN client software to access the corporate network and to access, download, and execute the process software.

When using a site-to-site VPN, the process software is typically deployed, accessed and executed through the use of dedicated equipment and large-scale encryption. These tools are often used to connect multiple fixed sites of a larger company over a public network such as the Internet.

The process software is transported over the VPN via a process called tunneling. Tunneling is process involving the placing of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 7A-7C should be more readily understood.

Figure 7A:
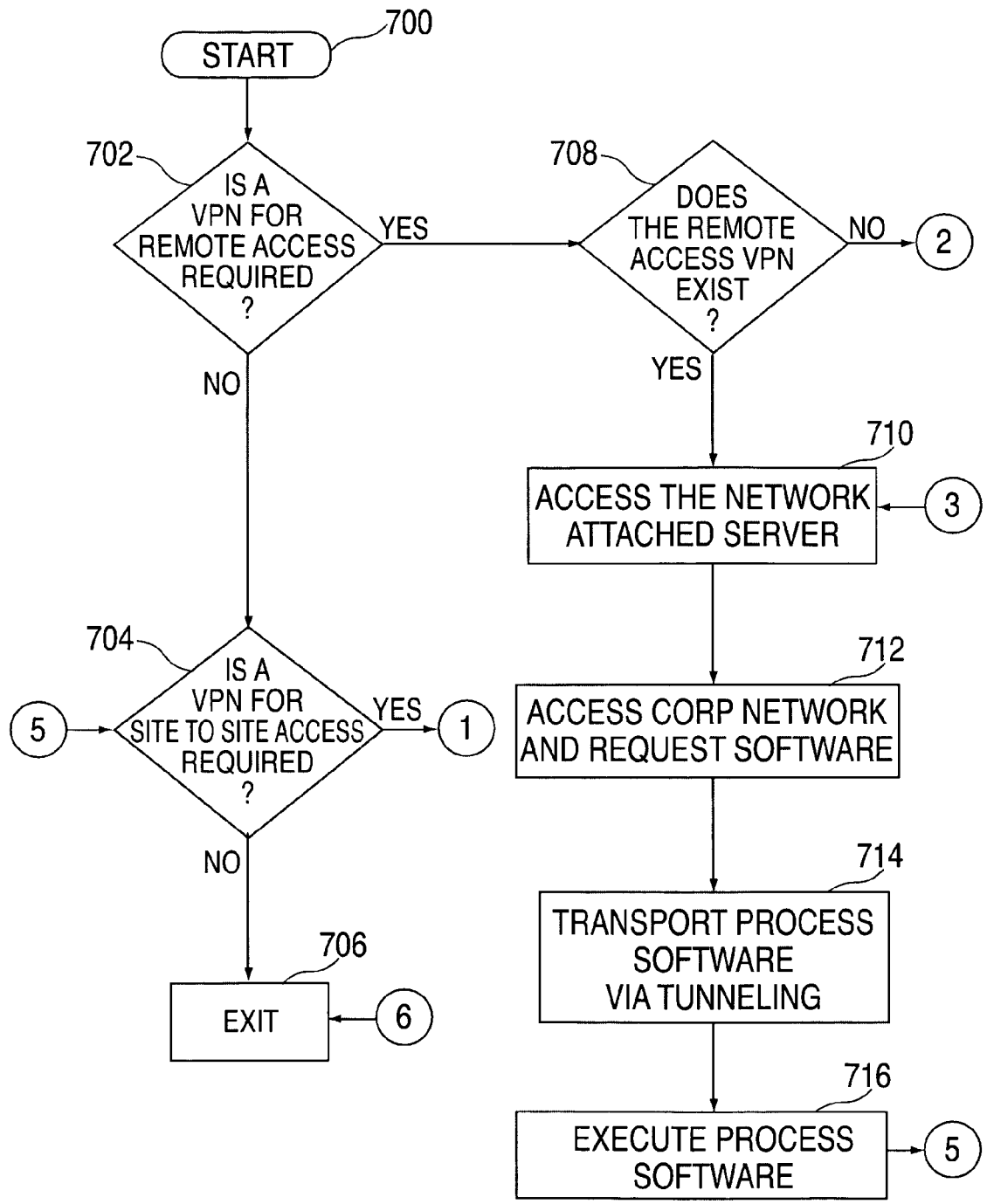
FIGS. 7A through 7C are flowcharts illustrating how process software for implementing the systems and methods of the invention are deployed through the installation and use of two different forms of a virtual private network (VPN)
Figure 7B:
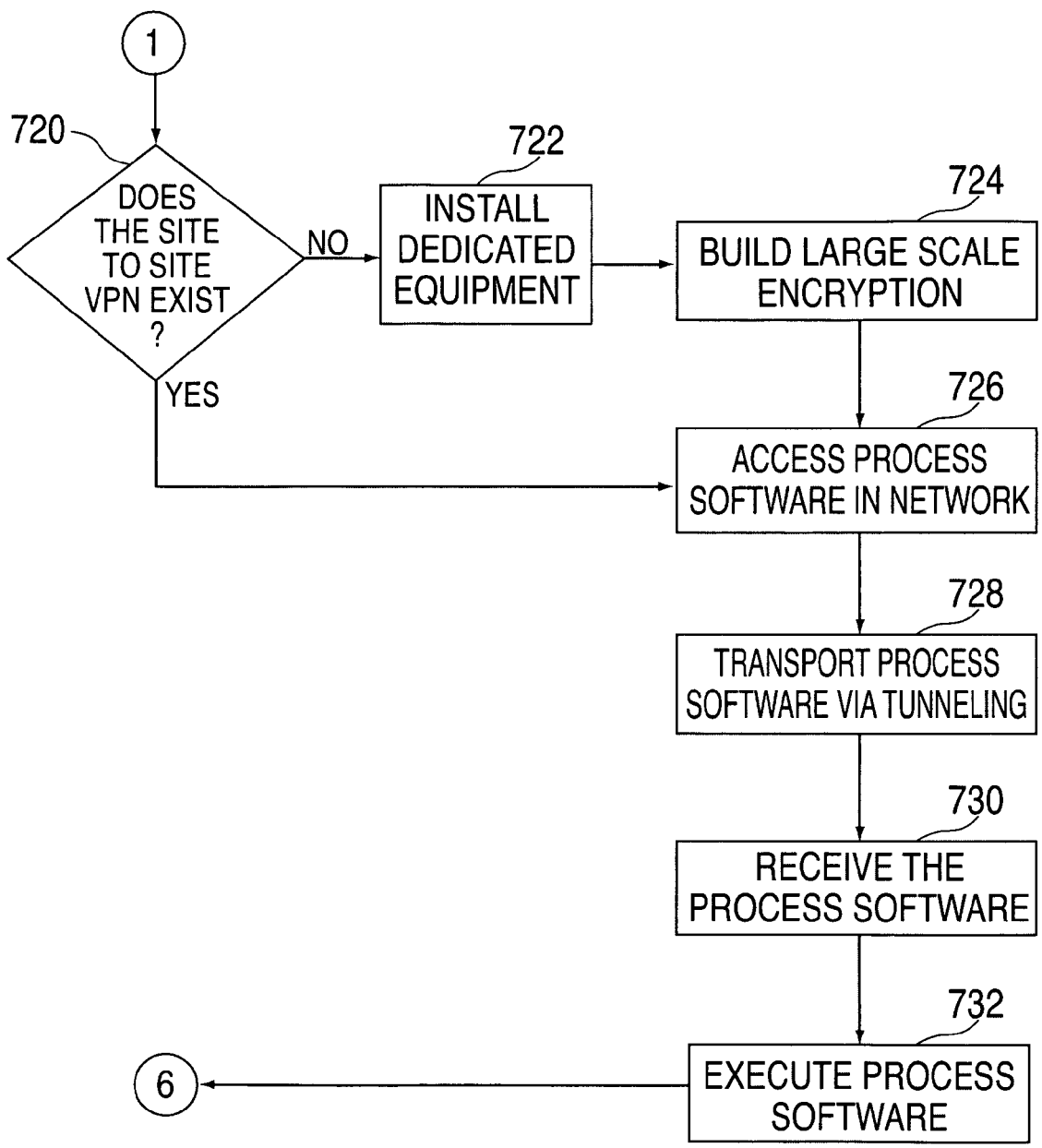
Figure 7C:
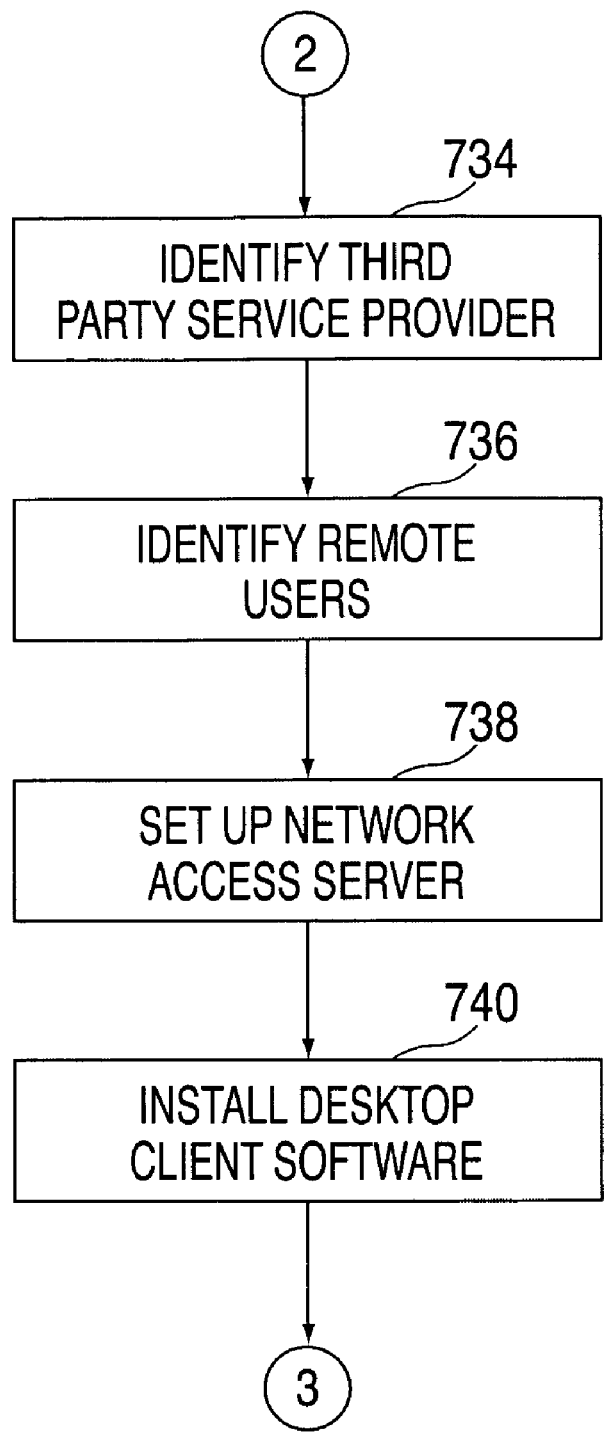

Step 700 in FIG. 7A begins the virtual private network (VPN) process. A determination is made at step 702 to see if a VPN for remote access is required. If it is not required, then flow proceeds to step 704. If it is required, then flow proceeds to step 708 where a determination is made as to whether a remote access VPN exists that is available for use.

If a remote access VPN does exist, then flow proceeds to step 710 in FIG. 7A. Otherwise flow proceeds to step 734 (see top of FIG. 7C), where a third party provider that will provide the secure, encrypted connections between the company's private network and the company's remote users is identified. Next, as indicated in step 736, the company's remote users are identified. Then, at step 738, the identified third party provider then sets up a network access server (NAS). The NAS allows the remote users to dial a phone number (typically a toll free number) or attach directly via a cable, DSL, wireless or other modem to access, download and install the desktop client software for the remote-access VPN as indicated at step 740.

Returning to step 710 in FIG. 7A, after the remote access VPN has been built or if it been previously installed, the remote users can then access the process software by dialing into the NAS or attaching directly via a cable, DSL, or other modem into the NAS. This step 710 allows entry into the corporate network, as indicated at step 712, where the process software may be accessed. The process software is transported to the remote user's desktop computer over the network via tunneling. During tunneling, see step 714, the process software is divided into packets and each packet, including the data and protocol for that packet, is placed within another packet. When the process software arrives at the remote user's desktop computer, it is removed from the packets, reconstituted, and then may be executed on the remote users desktop, as indicated at step 716.

Returning now to step 704 in FIG. 7A, a determination is made to see if a VPN for site-to-site access is required. If it is not required, then the process exits at step 706. If it is required, flow proceeds to step 720 (see top of FIG. 7B) to determine if the site-to-site VPN exists. If it does exist, then flow proceeds to step 726. If it does not exist, then as indicated at step 722, dedicated equipment required to establish a site-to-site VPN is installed. Then the large-scale encryption is built into the VPN at step 724.

After the site-to-site VPN has been built or if it had been previously established, the users access the process software via the VPN as indicated in step 726. Next, the process software is transported to the site users over the network via tunneling as indicated in step 728. As previously explained, the process software is divided into packets and each packet including the data and protocol is placed within another packet, as indicated in step 730. When the process software arrives at the remote user's desktop, it is removed from the packets, reconstituted, and is executed on the site users desktop at step 732. The process then proceeds to step 706 and exits.

Figure 8A:
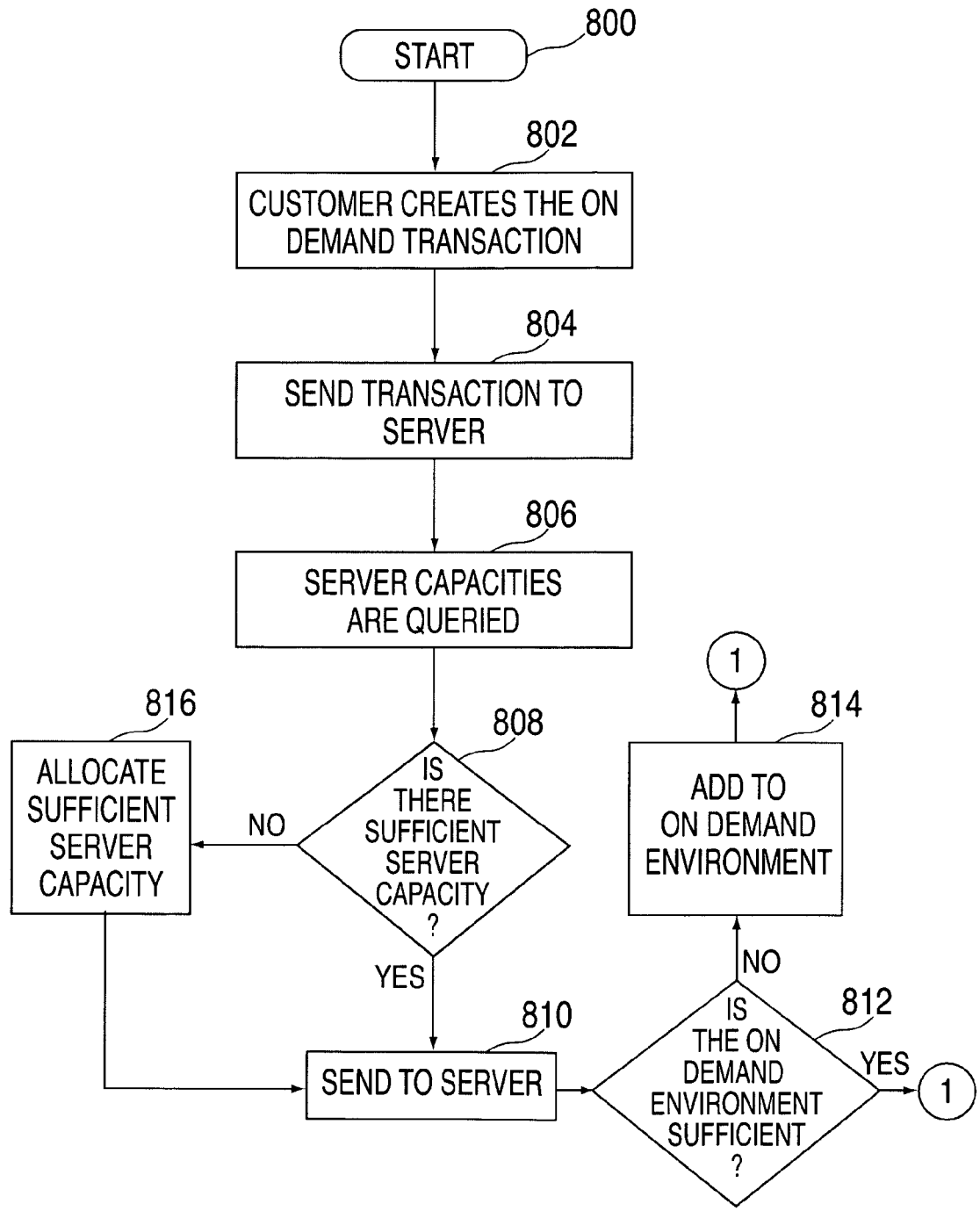
FIGS. 8A and 8B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 8B:
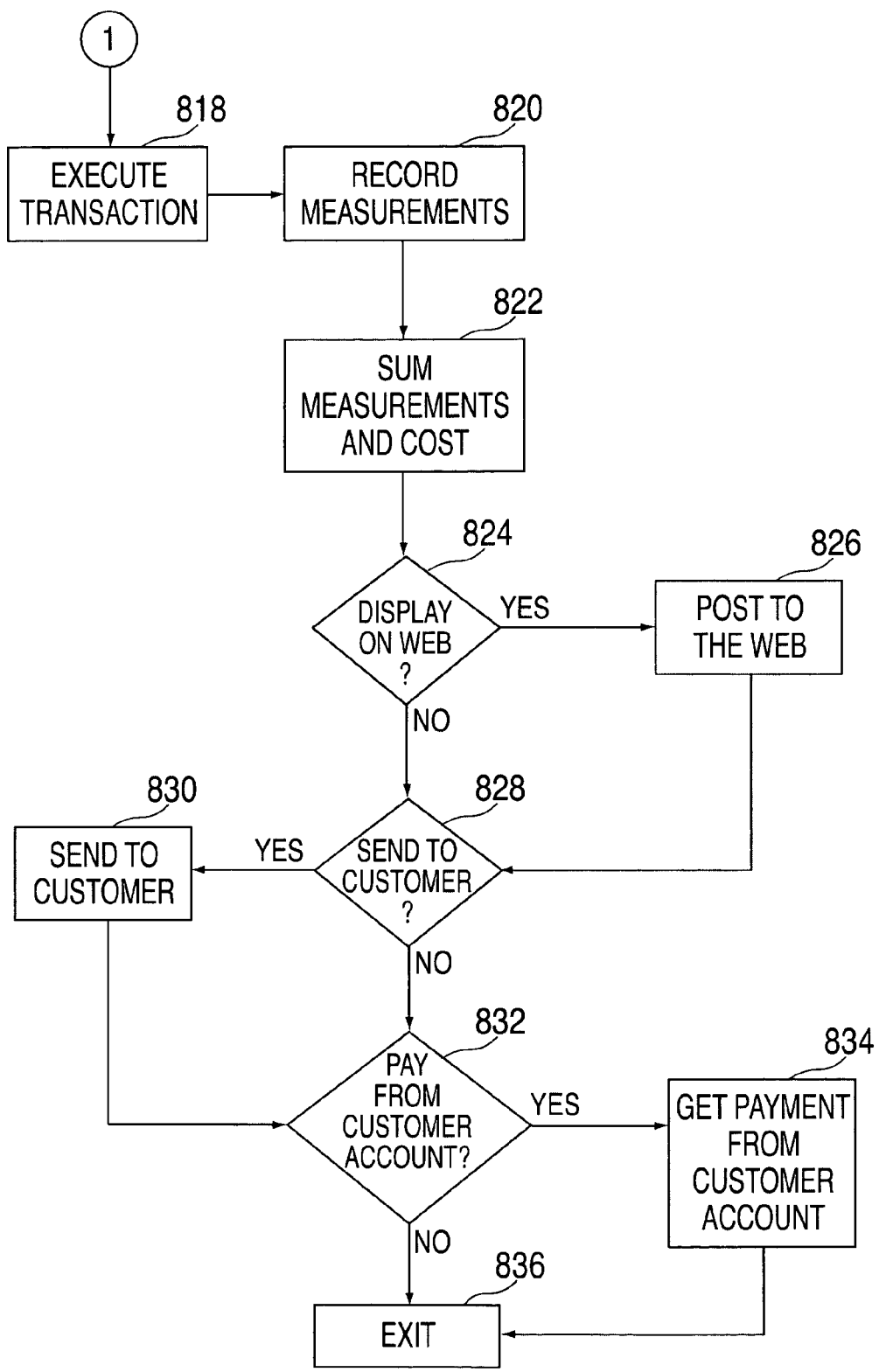

On Demand Computing for Information Processing System Software. The process software for implementing the information processing system of the present invention may be shared; that is, it may be used to simultaneously serve multiple customers in a flexible, automated fashion. It is process software that is easily standardized, requiring little customization, and it is scalable, thus providing capacity on demand in a pay-as-you-go model known as "on demand" computing. An overview of on demand computing as applied to the intelligent team management system software will now be provided, followed by a more detailed description of same made with reference to the flowcharts of FIGS. 8A and 8B.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc., approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, and the following detailed description of same with reference to FIGS. 8A and 8B where the on demand processes are illustrated, will be more easily understood.

Step 800 begins the On Demand process. A transaction is created that contains the unique customer identification, the requested service type and any service parameters that further specify the type of service as indicated in step 802. The transaction is then sent to the main server as shown in step 804. In an On Demand environment, the main server may initially be the only server. Then, as capacity is consumed, other servers are added to the On Demand environment.

The server central processing unit (CPU) capacities in the On Demand environment are queried at step 806. The CPU requirement of the transaction is estimated, then the servers' available CPU capacity in the On Demand environment are compared to the transaction CPU requirement to see if there is sufficient CPU available capacity in any server to process the transaction as indicated in step 808. If there is not sufficient server CPU available capacity, then additional server CPU capacity is allocated to process the transaction as indicated in step 816. If there was already sufficient available CPU capacity, the transaction is sent to a selected server at step 810.

Before executing the transaction, a check is made of the remaining On Demand environment to determine if the environment has sufficient available capacity for processing the transaction as indicated at step 812. This environment capacity consists of elements such as, but not limited to, network bandwidth, processor memory, storage, etc. If there is insufficient available capacity, then capacity will be added to the On Demand environment as indicated in step 814. Next the required software to process the transaction is accessed, loaded into memory, and the transaction is executed as indicated in step 818.

The usage measurements are recorded as indicated in step 820. The usage measurements consist of the portions of those functions in the On Demand environment that are used to process the transaction. The usage of functions such as, but not limited to, network bandwidth, processor memory, storage and CPU cycles are what is recorded. The usage measurements are summed, multiplied by unit costs, and then recorded as a charge to the requesting customer as indicated in step 822.

If the customer has requested that the On Demand costs be posted to a web site as indicated in step 824, then they are posted to a web site at step 826. If the customer has requested that the On Demand costs be sent via e-mail to a customer address as indicated in step 828, then they are sent to the customer via e-mail as indicated in step 830. If the customer has requested that the On Demand costs be paid directly from a customer account at step 832, then payment is received directly from the customer account at step 834. The On Demand process proceeds to step 836 and then exits.

As indicated above, the information processing system constitutes a dynamic information filter that works by harnessing the normal user activities of sorting and organizing web information, as well as by allowing the results of these activities to be syndicated and shared with others, thereby establishing a loop that progressively refines the filter with little human intervention.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer implemented method for providing web information processing services over a network, the method comprising:

automatically scanning at least one data feed for content relevant to a first subject category and automatically associating relevant content found as a result of the scanning with the first subject category, the first subject category pre-selected by a first web user having a first terminal operatively coupled to the network;

filtering unrelated content from the first subject category;

creating a first domain including results of the associating, and associating the first domain with the first web user, the first domain including web link based upon at least one of a centralized taxonomy and the first web user's personalized taxonomy;

publishing the first domain as a syndicatable data feed over a network;

scanning at least one data feed for content relevant to a second subject category, the at least one data feed including the first domain;

associating relevant content found as a result of the scanning with the second subject category, the second subject category selected by a second web user having a second terminal operatively coupled to the network and to the first terminal;

filtering unrelated content from the second subject category, wherein scanning at least one data feed for content relevant to the first subject category and the second subject category, and filtering unrelated content from the first subject category and the second subject category are categorization functions;

creating a second domain including results of the associating, and associating the first domain with the first web user by incorporating a portion of the first domain into the second domain and by incorporating a portion of the second domain into the first domain, thereby overlapping the first domain and the second domain, the second domain including web link based upon at least one of a centralized taxonomy and the second web user's personalized taxonomy;

publishing the second domain as a syndicatable data feed over a network, thereby enabling social chaining of domain information, wherein social chaining includes refining the first subject category, responsive to input by the second web user, and refining the second subject category, responsive to input from the first user;

detecting and evaluating changes made to the first subject category and the second subject category to determine behavior of the first and second users;

modifying the categorization functions based on detecting and evaluating changes made to the first subject category and the second subject category to determine behavior of the first and second users, wherein the categorization functions automatically learn and update preferences of the first and second web users as each of the first and second web users customizes the categorization functions, wherein the categorization functions move one or more web link between the first and second domains in response to categorization functions learning the preferences of the first and second web users, and wherein the categorization functions give the data feed to the first and second web users based on at least one of a centralized taxonomy, the first web user's personalized taxonomy and the second web user's personalized taxonomy, and a set of key words from at least one of the first web user and the second web user, wherein refining the first subject category, responsive to input by the second web user, and refining the second subject category, responsive to input from the first user and the automatic updating and learning of the categorization functions are based on the user's input of moving, deleting and adding content in the domains, progressive sharing and social filtering, the first domain including web link based upon at least one of a centralized taxonomy and the first web user's personalized taxonomy; and deploying, accessing, and executing process software for providing web information processing services, said deploying, accessing, and executing process software implemented through a virtual private network, wherein the process software is transported to the first and second terminals over the network via tunneling, the process software being divided into one or more packets and each of the one or more packets packet, includes data and protocol for the one or more packets, is placed within a single packet, and when the process software arrives at the first and second terminals, the process software is removed from the single packet and the one or more packets, reconstituted, and is available for execution at the first and second terminals.

2. The method of claim 1, further comprising:
modifying the relevant content in response to input provided by the first web user, the modifying including at least one of:
deleting the relevant content from the first domain; and
moving the relevant content from the first subject category to an other category in the first domain; and
refining future scanning and categorization of data feeds based upon the input provided by the first web user.

3. The method of claim 2, wherein the first subject category is defined by the first web user and the second subject category is defined by the second web user.

4. The method of claim 1, further comprising:
modifying the relevant content in response to input provided by the second web user, the modifying including at least one of:
deleting the relevant content from the second domain; and
moving the relevant content from the second subject category to another category in the second domain.

5. The method of claim 1, wherein the publishing includes formatting the first domain via at least one of:
Rich Site Summary standard;
Atom standard;
Outline Processing Markup Language standard; and
a combination of at least two of the Rich Site Summary standard, Atom standard, and Outline Processing Markup Language standard.

6. The method of claim 1, further comprising:
deploying process software for providing web information processing services, said deploying comprising:
installing said process software on at least one server;
identifying server addresses for users accessing said process software on said at least one server;
installing a proxy server when needed;
sending said process software to said at least one server and copying said process software to a file system of said at least one server;
sending the process software to at least a first client computer; and
executing said process software on said first client computer.

7. The method of claim 6, wherein said installing said process software further comprises:
determining if programs will reside on said at least one server when said process software is executed;
identifying said at least one server that will execute said process software; and
transferring said process software to storage for said at least one server.

8. The method of claim 6, wherein said sending said process software to said first client computer further includes having said at least one server automatically copy said process software to said first client computer, and running an installation program at said first client computer to install said process software on said first client computer.

9. The method of claim 6, wherein said sending said process software to said first client computer further comprises identifying a user and an address of said first client computer.

10. The method of claim 6, wherein said sending said process software to said first client computer includes sending said process software to at least one directory on said first client computer.

11. The method of claim 1, further comprising integrating process software for providing web information processing services, said integrating comprising:
determining when said process software will execute on at least one server;
identifying an address of said at least one server;
checking said at least one server for operating systems, applications, and version numbers for validation with said process software, and identifying any missing software applications for said at least one server that are required for integration;
updating said at least one server with respect to any operating system and application that is not validated for said process software, and providing any of said missing software applications for said at least one server required for integration;
identifying client addresses and checking client computers for operating systems, applications, and version numbers for validation with said process software, and identifying any software applications missing from said client computers that are required for integration;
updating said client computers with respect to any operating system and application that is not validated for said process software, and providing any missing software application for said client computers required for said integration; and installing said process software on said client computers and said at least one server.

12. The method of claim 1, further comprising on-demand sharing of process software for providing web information processing services, said on demand sharing comprising:
creating a transaction containing unique customer identification, requested service type, and service parameters;
sending said transaction to at least one main server;
querying said at least one main server about processing capacity associated with said at least one main server to help ensure availability of adequate resources for processing of said transaction; and
allocating additional processing capacity when additional capacity appears needed to process said transaction, said additional processing capacity being selected from the group of additional capacities consisting of central processing unit capacity, processor memory capacity, network bandwidth capacity, and storage capacity.

13. The method of claim 1, wherein deploying, accessing, and executing process software for providing web information processing services, said deploying, accessing, and executing process software implemented through a virtual private network, further comprises:
checking for remote access to said virtual private network when it is required;
if said remote access does not exist, identifying a third party provider to provide secure, encrypted connections between a private network and remote users;
identifying said remote users; and
setting up a network access server operable for downloading and installing client software on desktop computers for remote access of said virtual private network;
accessing said process software;
transporting said process software to at least one remote user's desktop computer; and
executing said process software on said at least one remote user's desktop computer.

14. A system for providing web information processing services, comprising:
a host system executing an information processing application including a categorization engine;
a storage device in communication with the host system; and
a link to a communications network; wherein the information processing application performs:
automatically scanning at least one data feed for content relevant to a first subject category and automatically associating relevant content found as a result of the scanning with the first subject category, the first subject category pre-selected by a first web user;
filtering unrelated content from the first subject category;
creating a first domain including results of the associating, and associating the first domain with the first web user, the first domain including web link based upon at least one of a centralized taxonomy and the first web user's personalized taxonomy;
publishing the first domain as a syndicatable data feed over a network;
scanning at least one data feed for content relevant to a second subject category, the at least one data feed including the first domain;
associating relevant content found as a result of the scanning with the second subject category, the second subject category selected by a second web user;
filtering unrelated content from the second subject category, wherein scanning at least one data feed for content relevant to the first subject category and the second subject category, and filtering unrelated content from the first subject category and the second subject category are categorization functions;
creating a second domain including results of the associating, and associating the first domain with the first web user by incorporating a portion of the first domain into the second domain and by incorporating a portion of the second domain into the first domain, thereby overlapping the first domain and the second domain, the second domain including web link based upon at least one of a centralized taxonomy and the second web user's personalized taxonomy;
publishing the second domain as a syndicatable data feed over a network, thereby enabling social chaining of domain information, wherein social chaining includes refining the first subject category, responsive to input by the second web user, and refining the second subject category, responsive to input from the first user;
detecting and evaluating changes made to the first subject category and the second subject category to determine behavior of the first and second users;
modifying the categorization functions based on detecting and evaluating changes made to the first subject category and the second subject category to determine behavior of the first and second users, wherein the categorization functions automatically learn and update preferences of the first and second web users as each of the first and second web users customizes the categorization functions, wherein the categorization functions move one or more web link between the first and second domains in response to categorization functions learning the preferences of the first and second web users, and wherein the categorization functions give the data feed to the first and second web users based on at least one of a centralized taxonomy, the first web user's personalized taxonomy and the second web user's personalized taxonomy, and a set of key words from at least one of the first web user and the second web user,
wherein refining the first subject category, responsive to input by the second web user, and refining the second subject category, responsive to input from the first user and the automatic updating and learning of the categorization functions are based on the user's input of moving, deleting and adding content in the domains, progressive sharing and social filtering, the first domain including web link based upon at least one of a centralized taxonomy and the first web user's personalized taxonomy; and
deploying, accessing, and executing process software for providing web information processing services, said deploying, accessing, and executing process software implemented through a virtual private network, wherein the process software is transported to the first and second terminals over the network via tunneling, the process software being divided into one or more packets and each of the one or more packets packet, includes data and protocol for the one or more packets, is placed within a single packet, and when the process software arrives at the first and second terminals, the process software is removed from the single packet and the one or more packets, reconstituted, and is available for execution at the first and second terminals.

15. The system of claim 14, wherein the information processing application further performs:
    modifying the relevant content in response to input provided by the first web user, the modifying including at least one of:
        deleting the relevant content from the first domain; and
        moving the relevant content from the first subject category to an other category in the first domain and refining future scanning and categorization of data feeds based upon the input provided by the first web user.

16. The system of claim 15, wherein the first subject category is defined by the first web user and the second subject category is defined by the second web user.

17. The system of claim 14, wherein the information processing application further performs:
    modifying the relevant content in response to input provided by the second web user, the modifying including at least one of:
        deleting the relevant content from the second domain; and
        moving the relevant content from the second subject category to another category in the second domain.

18. The system of claim 14, wherein the formatting is performed via at least one of:
    Rich Site Summary standard;
    Atom standard;
    Outline Processing Markup Language standard; and
    a combination of at least two of the Rich Site Summary standard, Atom standard, and Outline Processing Markup Language standard.

19. A storage medium encoded with machine-readable program code for providing web information processing services, the program code including instructions for causing a host system to implement a method, comprising:
    automatically scanning at least one data feed for content relevant to a first subject category and automatically associating relevant content found as a result of the scanning with the first subject category, the first subject category pre-selected by a first web user;
    filtering unrelated content from the first subject category;
    creating a first domain including results of the associating, and associating the first domain with the first web user, the first domain including web link based upon at least one of a centralized taxonomy and the first web user's personalized taxonomy;
    publishing the first domain as a syndicatable data feed over a network;
    scanning at least one data feed for content relevant to a second subject category, the at least one data feed including the first domain;
    associating relevant content found as a result of the scanning with the second subject category, the second subject category selected by a second web user;
    filtering unrelated content from the second subject category, wherein scanning at least one data feed for content relevant to the first subject category and the second subject category, and filtering unrelated content from the first subject category and the second subject category are categorization functions;
    creating a second domain including results of the associating, and associating the first domain with the first web user by incorporating a portion of the first domain into the second domain and by incorporating a portion of the second domain into the first domain, thereby overlapping the first domain and the second domain, the second domain including web link based upon at least one of a centralized taxonomy and the second web user's personalized taxonomy;
    publishing the second domain as a syndicatable data feed over a network, thereby enabling social chaining of domain information, wherein social chaining includes refining the first subject category, responsive to input by the second web user, and refining the second subject category, responsive to input from the first user;
    detecting and evaluating changes made to the first subject category and the second subject category to determine behavior of the first and second users;
    modifying the categorization functions based on detecting and evaluating changes made to the first subject category and the second subject category to determine behavior of the first and second users, wherein the categorization functions automatically learn and update preferences of the first and second web users as each of the first and second web users customizes the categorization functions, wherein the categorization functions move one or more web link between the first and second domains in response to categorization functions learning the preferences of the first and second web users, and wherein the categorization functions give the data feed to the first and second web users based on at least one of a centralized taxonomy, the first web user's personalized taxonomy and the second web user's personalized taxonomy, and a set of key words from at least one of the first web user and the second web user,
    wherein refining the first subject category, responsive to input by the second web user, and refining the second subject category, responsive to input from the first user and the automatic updating and learning of the categorization functions are based on the user's input of moving, deleting and adding content in the domains, progressive sharing and social filtering, the first domain including web link based upon at least one of a centralized taxonomy and the first web user's personalized taxonomy; and
    deploying, accessing, and executing process software for providing web information processing services, said deploying, accessing, and executing process software implemented through a virtual private network, wherein the process software is transported to the first and second terminals over the network via tunneling, the process software being divided into one or more packets and each of the one or more packets packet, includes data and protocol for the one or more packets, is placed within a single packet, and when the process software arrives at the first and second terminals, the process software is removed from the single packet and the one or more packets, reconstituted, and is available for execution at the first and second terminals.

20. The storage medium of claim 19, further comprising instructions for causing the host system to implement:
    modifying the relevant content in response to input provided by the first web user, the modifying including at least one of:
        deleting the relevant content from the first domain; and
        moving the relevant content from the first subject category to an other category in the first domain; and
        refining future scanning and categorization of data feeds based upon the input provided by the first web user.

21. The storage medium of claim 20, wherein the first subject category is defined by the first web user and the second subject category is defined by the second web user.

22. The storage medium of claim 19, further comprising instructions for causing the host system to implement:
  modifying the relevant content in response to input provided by the second web user, the modifying including at least one of:
    deleting the relevant content from the second domain; and
    moving the relevant content from the second subject category to another category in the second domain.

23. The storage medium of claim 19, wherein the formatting is performed via at least one of:
  Rich Site Summary standard;
  Atom standard;
  Outline Processing Markup Language standard; and
  a combination of at least two of the Rich Site Summary standard, Atom standard, and Outline Processing Markup Language standard.

24. The storage medium of claim 19, further comprising instructions for causing the host system to implement deploying process software for providing web information processing services, said deploying comprising:
  installing said process software on at least one server;
  identifying server addresses for users accessing said process software on said at least one server;
  installing a proxy server when needed;
  sending said process software to said at least one server and copying said process software to a file system of said at least one server;
  sending the process software to at least a first client computer; and
  executing said process software on said first client computer.

25. The storage medium of claim 19, further comprising integrating process software for providing web information processing services, said integrating comprising:
  determining when said process software will execute on at least one server;
  identifying an address of said at least one server;
  checking said at least one server for operating systems, applications, and version numbers for validation with said process software, and identifying any missing software applications for said at least one server that are required for integration;
  updating said at least one server with respect to any operating system and application that is not validated for said process software, and providing any of said missing software applications for said at least one server required for said integration;
  identifying client addresses and checking client computers for operating systems, applications, and version numbers for validation with said process software, and identifying any software applications missing from said client computers that are required for integration;
  updating said client computers with respect to any operating system and application that is not validated for said process software, and providing any missing software application for said client computers required for said integration; and
  installing said process software on said client computers and said at least one server.

26. The storage medium of claim 19, further comprising on-demand sharing of process software for providing web information processing services, said on demand sharing comprising:
  creating a transaction containing unique customer identification, requested service type, and service parameters;
  sending said transaction to at least one main server;
  querying said at least one main server about processing capacity associated with said at least one main server to help ensure availability of adequate resources for processing of said transaction; and
  allocating additional processing capacity when additional capacity appears needed to process said transaction, said additional processing capacity being selected from the group of additional capacities consisting of central processing unit capacity, processor memory capacity, network bandwidth capacity, and storage capacity.

27. The storage medium of claim 19, wherein deploying, accessing, and executing process software for providing web information processing services, said deploying, accessing, and executing process software implemented through a virtual private network, further comprises:
  checking for remote access to said virtual private network when it is required;
  if said remote access does not exist, identifying a third party provider to provide secure, encrypted connections between a private network and remote users;
  identifying said remote users; and
  setting up a network access server operable for downloading and installing client software on desktop computers for remote access of said virtual private network;
  accessing said process software;
  transporting said process software to at least one remote user's desktop computer; and
  executing said process software on said at least one remote user's desktop computer.

* * * * *